US008392451B1

(12) United States Patent
Pierce et al.

(10) Patent No.: US 8,392,451 B1
(45) Date of Patent: Mar. 5, 2013

(54) ENHANCED DOMAIN NAME QUERY FOR USER DEVICE DOMAIN NAME INFORMATION

(75) Inventors: Robert J. Pierce, Castle Rock, CO (US); Austin C. Castaldi, San Carlos, CA (US); Brent A. Scott, Leeton, MO (US); John H. Bennett, III, Lawrence, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/044,281

(22) Filed: Mar. 9, 2011

(51) Int. Cl.
G06F 7/00 (2006.01)
G06F 17/30 (2006.01)
(52) U.S. Cl. ......... 707/769; 707/796; 709/227; 709/246
(58) Field of Classification Search .................. 707/706, 707/769, 771, 770, E17.014, E17.061; 370/328, 370/401, 350, 352, 338, 349, 389; 455/435, 455/432, 556, 557, 331, 461; 709/227, 205, 709/245, 206, 246, 220
See application file for complete search history.

(56) References Cited

U.S. PATENT DOCUMENTS

| | | | | |
|---|---|---|---|---|
| 5,881,131 | A * | 3/1999 | Farris et al. | 379/15.03 |
| 6,427,170 | B1 | 7/2002 | Sitaraman et al. | |
| 7,680,876 | B1 * | 3/2010 | Cioli et al. | 709/201 |
| 2004/0083306 | A1 * | 4/2004 | Gloe | 707/104.1 |
| 2005/0193074 | A1 * | 9/2005 | Garland | 709/206 |
| 2006/0101155 | A1 * | 5/2006 | Damour et al. | 709/238 |
| 2007/0014301 | A1 | 1/2007 | Miller et al. | |
| 2007/0208864 | A1 * | 9/2007 | Flynn et al. | 709/227 |
| 2008/0062997 | A1 * | 3/2008 | Nix | 370/395.2 |
| 2010/0095007 | A1 * | 4/2010 | Cherian et al. | 709/227 |
| 2010/0296445 | A1 * | 11/2010 | Sarikaya et al. | 370/328 |
| 2010/0332625 | A1 * | 12/2010 | Wu et al. | 709/220 |
| 2011/0145897 | A1 * | 6/2011 | Tyree | 726/6 |

OTHER PUBLICATIONS

Huachun Zhou & Hongke Zhang & Yajuan Qin & Hwang-Cheng Wang & Han-Chieh Chao—"A Proxy Mobile IPv6 Based Global Mobility Management Architectural and Protocol"—Published online: Jul. 2, 2009—# Springer Science + Business Media, LLC 2009—Published in: Journal Mobile Networks and Applications—vol. 15 Issue 4, Aug. 2010—(pp. 530-542).*

Mustafa Ergen—"Chapter 3 Basics of All-IP Networking"—M. Ergen, Mobile Broadband: Including WiMAX and LTE, DOI: 10.1007/978-0-387-68192-4 3, c Springer Science+Business Media LLC 2009 (pp. 67-106: 1-40).*

(Continued)

*Primary Examiner* — Anh Ly (57) ABSTRACT

What is disclosed is a method of operating a communication system. The method includes receiving a registration request for a user device and processing the registration request to associate a network address with domain name information for the user device. The method also includes transferring an update message for delivery to a local domain name database with the association between the network address and the domain name information for the user device, and withholding an update of the association in a master domain name database. The method also includes receiving a first query for the association between the network address and the domain name information for the user device into the master domain name database, and in response, transferring a second query for delivery to the local domain name database. The method also includes receiving the second query in the local domain name database, and in response, transferring the association between the network address and the domain name information for the user device for delivery to the master domain name database.

18 Claims, 6 Drawing Sheets

OTHER PUBLICATIONS

R. Braden: "Requirements for Internet Hosts—Application and Support;" Oct. 1989; pp. 1-98; Network Working Group; Request for Comments: 1123; Internet Engineering Task Force; http://tools.ietf.org/html/rfc1123.

R. Elz, et al.; "Clarifications to the DNS Specification;" Jul. 1997; pp. 1-15; Network Working Group; Request for Comments: 2181; Updates: 1034, 1035, 1123; Category: Standards Track; University of Melbourne; RGnet, Inc.; http://tools.ietf.org/html/rfc2181.

P. Mockapetris; "Domain Names—Concepts and Facilities," Nov. 1987; pp. 1-55; Network Working Group; Request for Comments: 1034; Obsoletes: RFCs 882, 883, 973; ISI; http://tools.ietf.org/html/rfc1034.

P. Mockapetris, "Domain Names—Implementation and Specification;" Nov. 1987; pp. 1-55; Network Working Group: Request for Comments: 1035; Obsoletes: RFCs 882, 883, 973; ISI: http://tools.ietf.org/html/rfc1035.

* cited by examiner

ENHANCED DOMAIN NAME QUERY FOR USER DEVICE DOMAIN NAME INFORMATION

TECHNICAL FIELD

Aspects of the disclosure are related to the field of communications, and in particular, querying domain name databases for user device information in communication networks.

TECHNICAL BACKGROUND

User devices typically receive access to communication services from access system, such as Internet Service Providers (ISPs), base stations, cellular communication networks, or other access systems. As a part of the access, network information, such as device or network identifiers, are exchanged and assigned to the user devices by the access systems. In examples of Internet protocol (IP) networks, an IP address is typically assigned to user devices by the access system or other systems.

Network addressing information, such as the IP addresses, can have additional information associated therewith, which could include associating a domain name with a particular network address, among other examples. Information about the domain name and network addressing associations is typically updated into master or regional domain name system (DNS) equipment, where external systems can query for the association information when attempting to communicate with the user devices or discover information about the user devices. However, in some communication networks, many user devices can be changing access states with the access systems, leading to many updates to the master or regional DNS equipment.

Overview

What is disclosed is a method of operating a communication system. The method includes receiving a registration request for a user device and processing the registration request to associate a network address with domain name information for the user device. The method also includes transferring an update message for delivery to a local domain name database with the association between the network address and the domain name information for the user device, and withholding an update of the association in a master domain name database. The method also includes receiving a first query for the association between the network address and the domain name information for the user device into the master domain name database, and in response, transferring a second query for delivery to the local domain name database. The method also includes receiving the second query in the local domain name database, and in response, transferring the association between the network address and the domain name information for the user device for delivery to the master domain name database.

What is also disclosed is a communication system. The communication system includes an access system configured to receive a registration request for a user device and process the registration request to associate a network address with domain name information for the user device. The access system is configured to transfer an update message for delivery to a local domain name database with the association between the network address and the domain name information for the user device, and withhold an update of the association in a master domain name database. The master domain name database is configured to receive a first query for the association between the network address and the domain name information for the user device, and in response, transfer a second query for delivery to the local domain name database. The local domain name database is configured to receive the second query, and in response, transfer the association between the network address and the domain name information for the user device for delivery to the master domain name database.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
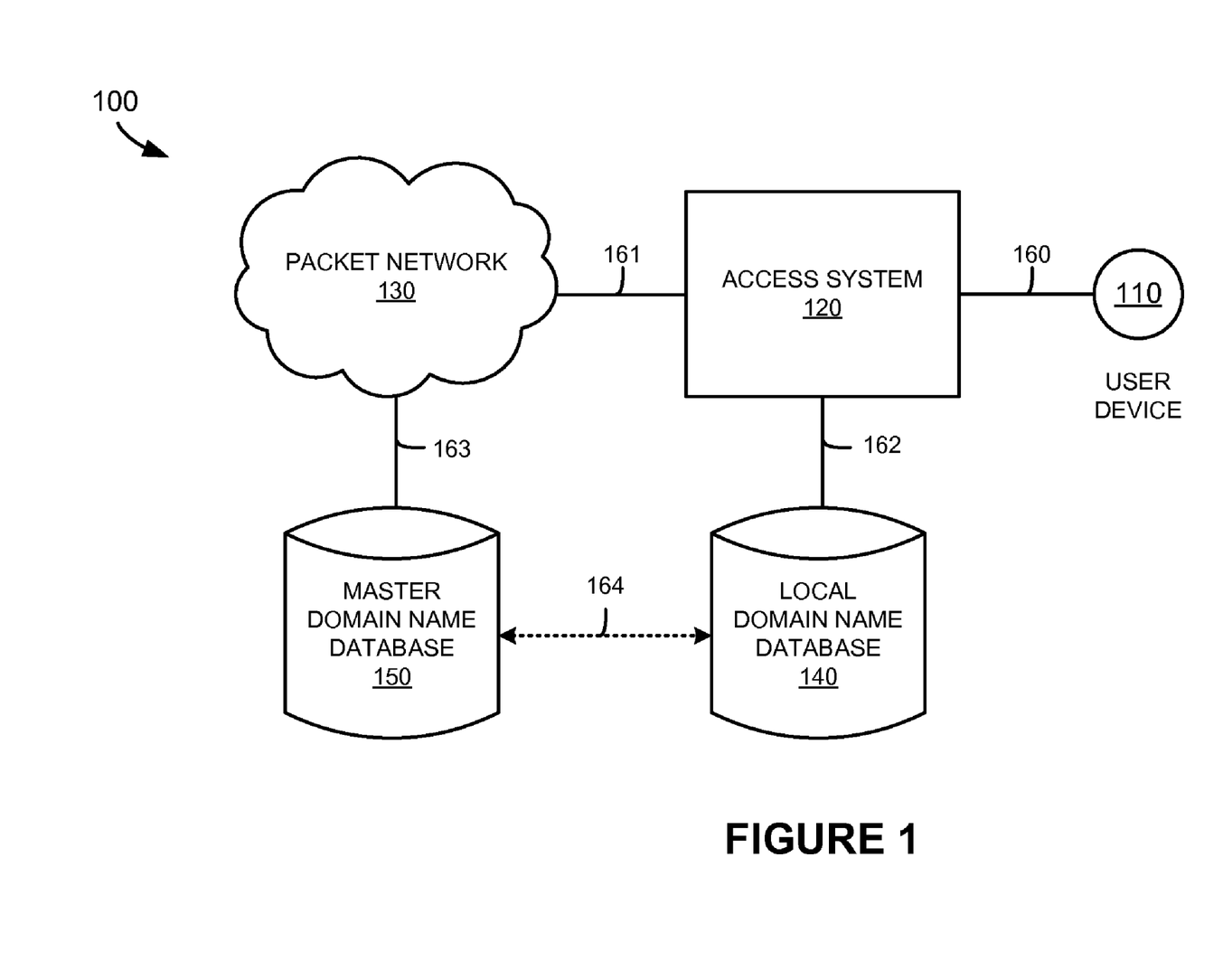
FIG. 1 is a system diagram illustrating a communication system.

FIG. 1 is a system diagram illustrating communication system 100. Communication system 100 includes user device 110, access system 120, packet network 130, local domain name database 140, and master domain name database 150. User device 110 and access system 120 communicate over link 160. Access system 120 and packet network 130 communicate over link 161. Access system 120 and local domain name database 140 communicate over link 162. Packet network 130 and master domain name database 150 communicate over link 163. Local domain name database 140 and master domain name database 150 are communicatively coupled over link 164. Although FIG. 1 includes only one user device, it should be understood that other user devices could be included.

In FIG. 1, user device 110 receives access to communication services over link 160 from access system 120. The communication services could be network access, data access, voice calls, web access, or wireless access, among other communication services. Also in FIG. 1, link 164 is merely representative of a communicative coupling between local domain name database 140 and master domain name database 150. Link 164 could be a logical, virtual, or network link provided over access system 120 and packet network 130, among other examples.

Figure 2:
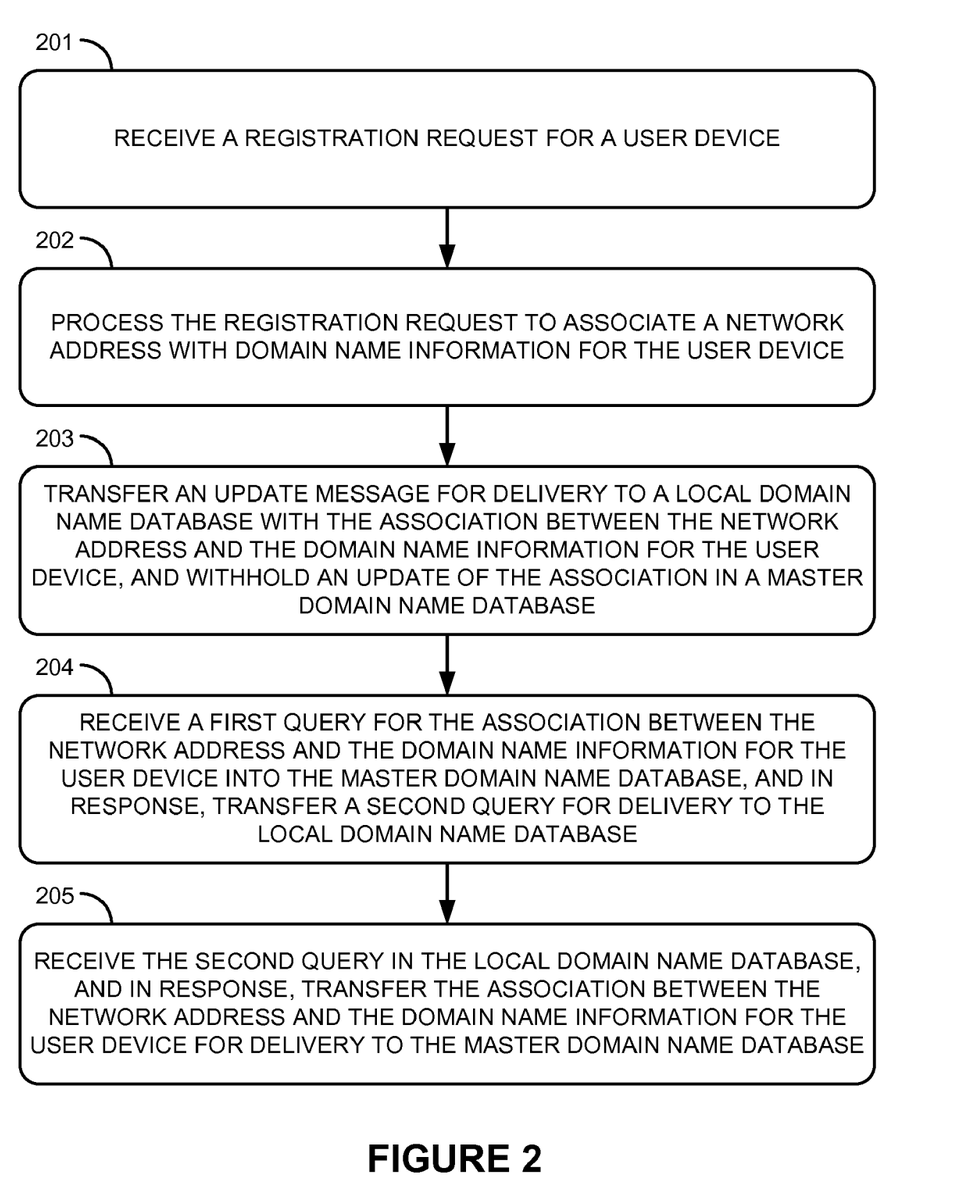
FIG. 2 is a flow diagram illustrating a method of operation of a communication system.

FIG. 2 is a flow diagram illustrating a method of operation of communication system 100. The operations of FIG. 2 are referenced herein parenthetically. In FIG. 2, access system 120 receives (201) a registration request for user device 110. The registration request could include a request for access to communication services through access system 120. In some examples, the request includes information associated with user device 110, such as network identifiers, device identifiers, user identifiers, or the type of communication service requested, among other information.

Access system 120 processes (202) the registration request to associate a network address with domain name information for user device 110. In response to the registration request, access system 120 could determine a network address for association with user device 110. This network address is typically associated with a communication session of user device 110, a user of user device 110, or circuitry and equipment of user device 110. The network address could include an Internet protocol (IP) address, among other examples. Access system 120 also determines domain name information for user device 110. The domain name information could include a plain-language identifier associated with the network address of user device 110. Examples of the domain name information include domain name system (DNS) domain names, email addresses, or could include portions of uniform resource locators (URL), such as scheme names, hostnames, top-level domain indicators, sub-domain indicators, among other information. Examples of domain name information representations could include user@ sprintpcs.com, or www.sprintpcs.com, including portions thereof or other examples. Access system 120 then associates the network address selected for user device 110 with the domain name information determined for user device 110. In some examples, the network address and domain name information are selected by different systems or equipment of access system 120.

Access system 120 transfers (203) an update message for delivery to local domain name database 140 with the association between the network address and the domain name information for user device 110, and withholds an update of the association in master domain name database 150. In this example, the update message is transferred over link 162 for delivery to local domain name database 140. The update message could be a database record, datagram, or a packetized message, such as a data packet or collection of data packets, among other formats, indicating the association between the network address and the domain name information. In some examples, the update message is a domain name system (DNS) resource record (RR). Access system 120 also withholds updating the association between the network address and domain name information in master domain name database 150. This withholding could include suppressing an update message from delivery to master domain name database 150, or could include not transferring an update message. After the update message has been received into local domain name database 140, then local domain name database 140 could update a database portion thereof to store the association for later retrieval.

Master domain name database 150 receives (204) a first query for the association between the network address and the domain name information for user device 110, and in response, transfers a second query for delivery to local domain name database 140. In this example, master domain name database 150 receives the first query over link 163 and over packet network 130. Other systems communicating over packet network 130 could have transferred the first query, such as user devices, computer systems, routers, gateways, or other equipment or systems. The first query could comprise a variety of types of queries. Some example queries include a domain name lookup query, where the query includes a domain name associated with user device 110. Other example queries include a reverse lookup query, where the query includes a network address associated with user device 110.

Master domain name database 150 typically responds to the first query with information requested in the first query. However, in this example, master domain name database 150 does not contain the association between the network address and the domain name information. In response to the first query, master domain name database 150 transfers a second query for delivery to local domain name database 140. In this example, the second query is transferred over link 164. Link 164 could be a direct physical link, or could be a logical link, such as a network link with information exchanged between network addresses associated with each of master domain name database 150 and local domain name database 140.

Local domain name database 140 receives (205) the second query, and in response, transfers the association between the network address and the domain name information for user device 110 for delivery to master domain name database 150. In this example, local domain name database 140 receives the second query over link 164, which could include transporting the second query over links 161 and 162, among other configurations. Also in this example, local domain name database 140 contains the association between the network address and domain name information for user device 110. In response to the second query, local domain name database 140 transfers this association, which could include providing only a requested portion of the association, such as the domain name information or the network address.

Figure 3:
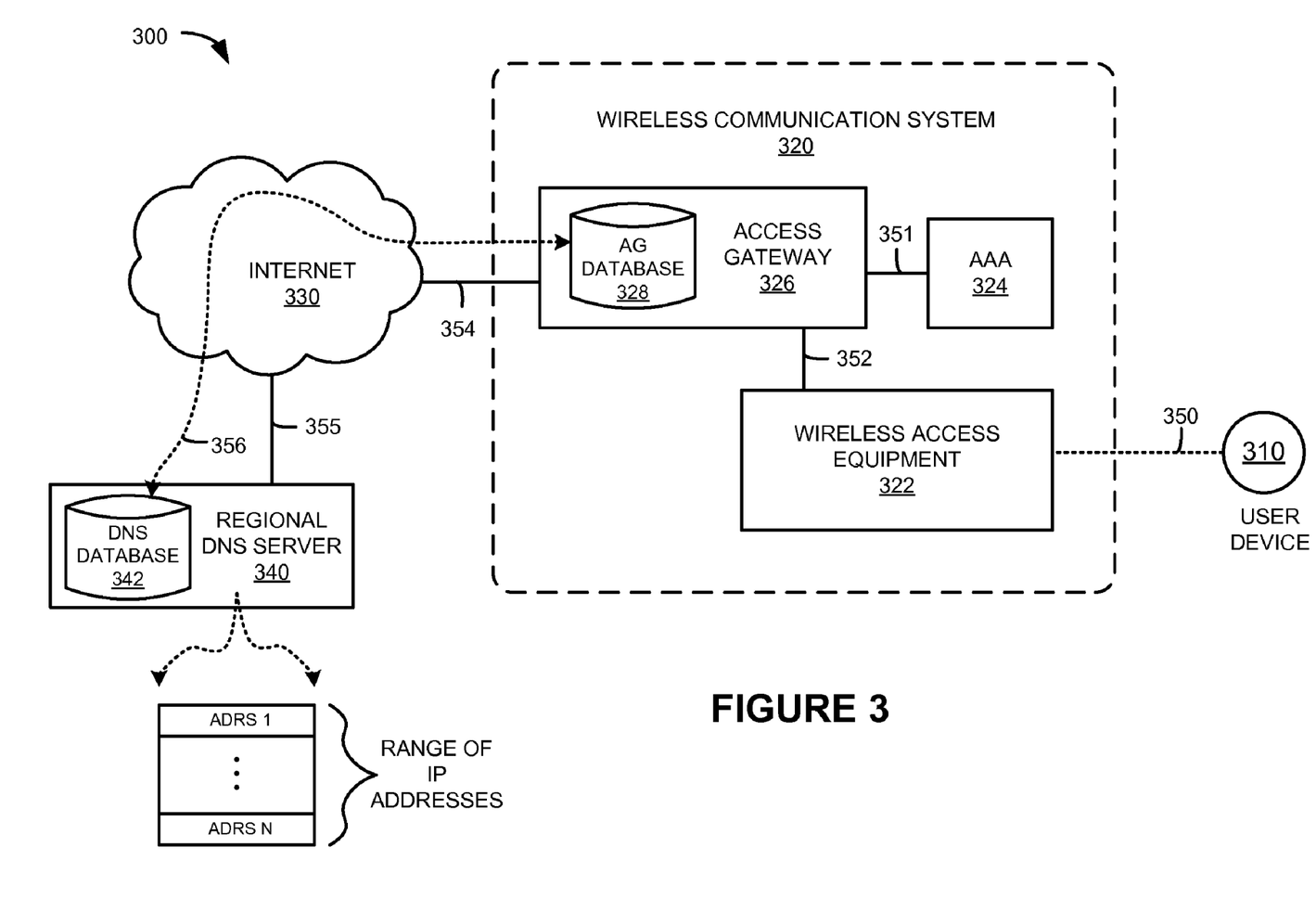
FIG. 3 is a system diagram illustrating a communication system.

FIG. 3 is a system diagram illustrating communication system 300. Communication system 300 includes user device 310, wireless communication system 320, Internet 330, and regional domain name system (DNS) server 340. User device 310 and wireless communication system 320 communicate over wireless link 350, which is a Code Division Multiple Access (CDMA) wireless link in this example. Wireless communication system 320 and Internet 330 communicate over link 354, which is an optical metropolitan-area network capable of carrying Internet protocol (IP) traffic in this example. Internet 330 and regional DNS server 340 communicate over link 355, which an optical link capable of carrying IP traffic in this example.

User device 310 comprises a mobile wireless device capable of data communications over wireless link 350 using the CDMA wireless protocol in this example. It should be understood that other wireless protocols could be employed. Wireless communication system 320 includes a wireless network of a wireless communication provider, such as a cellular phone service provider, among other examples. Wireless communication system 320 includes wireless access equipment 322, authentication, authorization and accounting (AAA) system 324, and access gateway 326.

Wireless access equipment 322 and user device 310 communicate over CDMA link 350. Wireless access equipment 322 and access gateway 326 communicate over Ethernet network link 352. Access gateway 326 and AAA 324 communicate over Ethernet network link 351. Wireless access equipment 322 includes equipment and systems to provide wireless access to communication services for user devices over a geographic area. Wireless access equipment 322 could comprise base stations, base transceiver stations (BTS), radio node controllers (RNC), base station controllers (BSC), mobile switching centers (MSC), wireless access nodes, routers, transceivers, or antennas, among other equipment and systems. AAA 324 includes computer and processing equipment for authenticating and authorizing user devices for various wireless access features of wireless communication system 320, as well as equipment to determine accounting information for user devices, such as billing, metering, time-based usage, or other user device account monitoring information. Access gateway 326 includes equipment to route communications between wireless communication system 320 and external systems, such as Internet 330. Access gateway 326 could comprise mobile access gateways (MAG), network gateways, or network routers, among other equipment. Access gateway 326 includes access gateway (AG) database 328. AG database 328 includes computer and processing systems as well as computer-readable storage media for storing data, such as network address and domain name information for user devices, among other information. Although in this example, access gateway 326 includes AG database 328, in other examples, AAA 324 could include AG database 328 or another database configured to operate as described in FIGS. 3 and 4.

Internet 330 includes equipment and systems to route packet communications between endpoints using the Internet protocol (IP). Internet 330 could comprise routers, switches, gateways, bridges, as well as various network links. Regional DNS server 340 includes equipment and systems for storing domain name information and providing domain name resolution services for Internet 330, such as resolving alphanumerical domain names into numerical network addresses. Although one regional DNS server 340 is shown in FIG. 3, various other DNS servers could be associated with Internet 330, or arranged into a hierarchical system of top-level DNS servers and regional DNS servers, among other configurations. Regional DNS server 340 include DNS database (DB) 342 in this example. DNS database 342 includes database systems and equipment, such as computer systems, computer-readable storage media, or other systems to store and retrieve domain name resolution information for regional DNS server 340.

Figure 4:
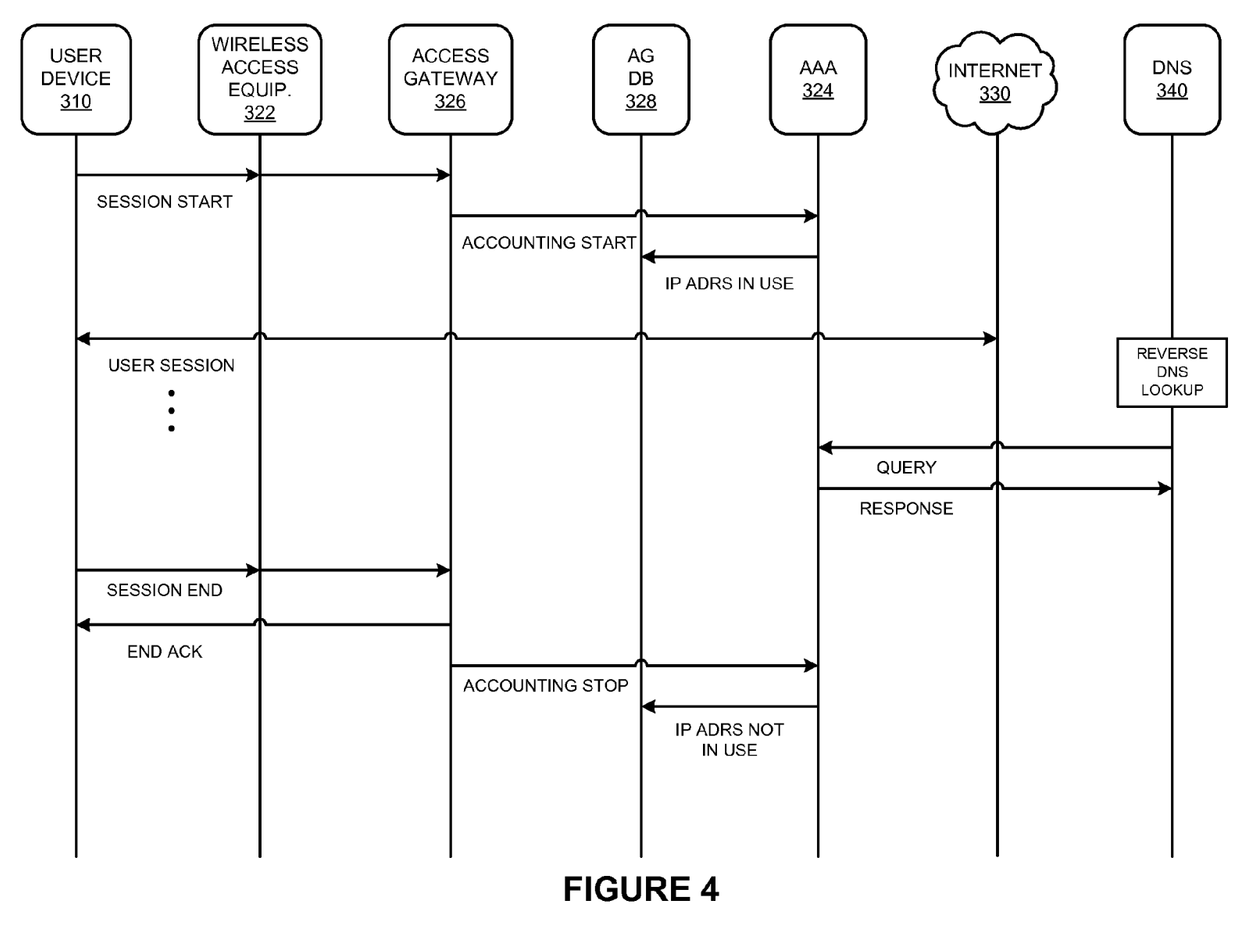
FIG. 4 is a sequence diagram illustrating a method of operation of a communication system.

FIG. 4 is a sequence diagram illustrating a method of operation of communication system 300. In FIG. 4, user device 310 transfers a registration request to wireless access equipment 322 to request wireless network access to communication services, as indicated by the session start arrow. The session start process could include wireless access equipment 322 and user device 310 negotiating via wireless link 350 to determine various wireless protocol parameters to enable further wireless communication over wireless link 350 for a present communication session. In this example, the communication session is for wireless network access to the Internet, such as for email, web pages, streaming media data, among other Internet services or data communications. An indication of the session start is transferred to access gateway 326, which determines a network address for user device 310 for the communication session. In this example, access gateway 326 determines an IP address for user device 310, and indicates the IP address to user device 310 though wireless access equipment 322. Access gateway 326 also determines domain name information for user device 310, which could include determining a hostname, URL, or other domain name information. The IP address or domain name information for user device 310 could be selected from a pool of IP addresses or predetermined domain names, or could be assigned randomly or according to a domain name generation algorithm upon the request for the communication session by user device 310. Although in this example, access gateway 326 determines the IP address and domain name information for user device 310, in other examples, AAA 324 or other systems of wireless communication system 320 could determine the network address or domain name information.

Access gateway 326 then indicates to AAA 324 an accounting start condition in an accounting start message. Typically, the accounting start message indicates to AAA 324 to begin a billing process, such as to start a billing timer or counter or to associate a network usage monitor or metering process with the present communication session of user device 310. The accounting start message could include the network address and domain name information associated with user device 310 for use in the billing or metering processes, or for other purposes such as user account records. In some examples, the accounting start message comprises an Accounting-Request (Start) message. In this example, the accounting start message also prompts AAA 324 to indicate to AG database (DB) 328 that the associated IP address is in use for the present communication session for user device 310. Although AG database 328 is shown within access gateway 326 in this example, AG database 328 could be included in separate systems or equipment from access gateway 326. AG database 328 then stores the IP address and domain name information for user device 310, along with any associations thereof. AG database 328 could receive the IP address or domain name information from access gateway 326 or from AAA 324, among other examples.

In typical Internet operation, when a domain name is associated with a network address, a DNS server associated with the Internet is updated with the association. However, in this example, the association is stored in AG database 328 and not updated within regional DNS server 340 or DNS database 342. Thus, an update of the domain name association is withheld from being updated with a DNS database associated with Internet 330. AG database 328 is associated with wireless communication system 320 in this example.

After the network address and domain name information has been determined and stored in AG database 328, and after completion of any other network negotiation and authorization for user device 310, then the user session as requested by user device 310 commences. This user session could include data exchange, web access, or email transfer, among other data communication services over Internet 330.

During the user session, regional DNS server 340 receives a request for a reverse DNS lookup for user device 310. A reverse DNS lookup includes resolving a numerical network address, such as an IP address, into an alphanumerical domain name, such as a web address, hostname, URL, or other domain name. In contrast, a DNS lookup typically resolves a domain name, such as a URL, into a numerical network address, such as an IP address. The reverse DNS lookup can comprise a query received over Internet 330 which includes a numerical network address of user device 310 as a target of the reverse DNS lookup process. However, since regional DNS server 340 and DNS database 342 do not contain the association between the IP address and domain name information for user device 310, regional DNS server 340 or DNS database 342 cannot directly provide the domain name information in response to the reverse DNS lookup. Instead, regional DNS server 340 transfers a query to AG database 328 over network link 356 to attempt to receive the association information.

In response to the query from regional DNS server 340, AG database 328 determines the association between the IP address and domain name information for user device 310, and transfers a response which includes the association information. Determining the association could include searching a computer readable medium of AG database 328 for the association information previously stored therein. The queries and responses could comprise user datagram protocol (UDP) packets or transmission control protocol (TCP) packets, among other formats. Regional DNS server 340 then transfers a response to the source of the reverse DNS lookup request, where the response indicates the association between the network address and the domain name information for user device 310.

In this example, regional DNS server 340 or DNS database 342 are configured to issue the query to AG database 328 for the association information between the IP address and domain name information for user device 310. Regional DNS server 340 or DNS database 342 could be configured by modifying a query response behavior of regional DNS server 340 or DNS database 342, where the modified query response behavior indicates that regional DNS server 340 or DNS database 342 transfers a second query to AG database 328 to determine the association between the network address and the domain name information for user device 310 instead of processing contents of DNS database 342 to determine the association. Regional DNS server 340 or DNS database 342 to query AG database 328 could be configured to query AG database 328 for domain name associations for a range of network addresses, where the range of network addresses comprises the network address of user device 310 in this example. As shown in FIG. 3, a range of IP addresses, namely ADRS '1' through ADRS 'N,' could be employed and associated with prompting a second query to AG database 328 for reverse DNS lookup queries received in regional DNS server 340. Systems or equipment of wireless communication system 320 could inform regional DNS server 340 or DNS database 342 of the range of network addresses which should prompt a second query to AG database 328. These ranges of IP addresses, as well as the second query and response, could be transferred over link 356, which could include transporting communications over links 355, Internet 330, and link 354.

When user device 310 completes the present communication session, such as due to a completed data transfer, a user logging out of a network service, or a dropped communication session, among other triggers, user device 310 transfers an indication of the session end. As in the session start, a negotiation process may be included which terminates the wireless network connection between user device 310 and wireless access equipment 322. Access gateway 326 receives notification of the session end process, and transfers an acknowledge message to user device 310 indicating the present communication session has terminated. In some examples, such as a dropped communication session, some messaging between user device 310 and wireless access equipment 322 or access gateway 326 may be excluded.

In response to the session end messaging, access gateway 326 transfers an accounting stop message to AAA 324. The accounting stop message indicates to AAA 324 to stop a billing or metering process for user device 310. In some examples, the accounting stop message comprises an Accounting-Request (Stop) message. AAA 324 also transfers a disassociation message to AG database 328 that indicates the IP address associated with the present communication session for user device 310 is no longer in use. The IP address and domain name information could also be transferred to AAA 324. In response to the disassociation message, AG database 328 removes the association between the domain name information and the network address for user device 310. Although in this example, AG database 328 releases the IP address and domain name information for user device 310, in other examples, AAA 324, access gateway 326, or other systems of wireless communication system 320 could release the network address or domain name information from association with user device 310.

After the communication session has ended and the association between the IP address and domain name information for user device 310 has been released, no update or disassociation message is transferred for delivery to regional DNS server 340 or DNS database 342 in this example. Instead, AG database 328 removes the association between the IP address and domain name information for user device 310 and withholds an indication of disassociation from transfer to regional DNS server 340 or DNS database 342. The range of IP addresses shown in FIG. 4 remains unchanged after the disassociation. Further requests for reverse DNS lookups received by regional DNS server 340 would still prompt a responsive further query to AG database 328. However, since the association between the previous IP address and domain name information is no longer valid for user device 310, the further query to AG database 328 will not return an association. Instead, AG database 328 could withhold a response to the further query from regional DNS server 340 or DNS database 342, or return a response indicating an error or that no association is present for the requested domain name or IP address.

Further communication sessions of user device 310 or of other user devices could proceed in a similar manner, as described above. As the number of session start processes increases, such as due to increased traffic or an increased number of user devices, the number of updates to regional DNS server 340 or DNS database 342 does not increase. Instead, AG database 328 of wireless communication system 320 is updated with the associations between the IP addresses and domain name information, and regional DNS server 340 queries AG database 328 for the association information when corresponding requests are received into regional DNS server 340 over Internet 330.

Figure 5:
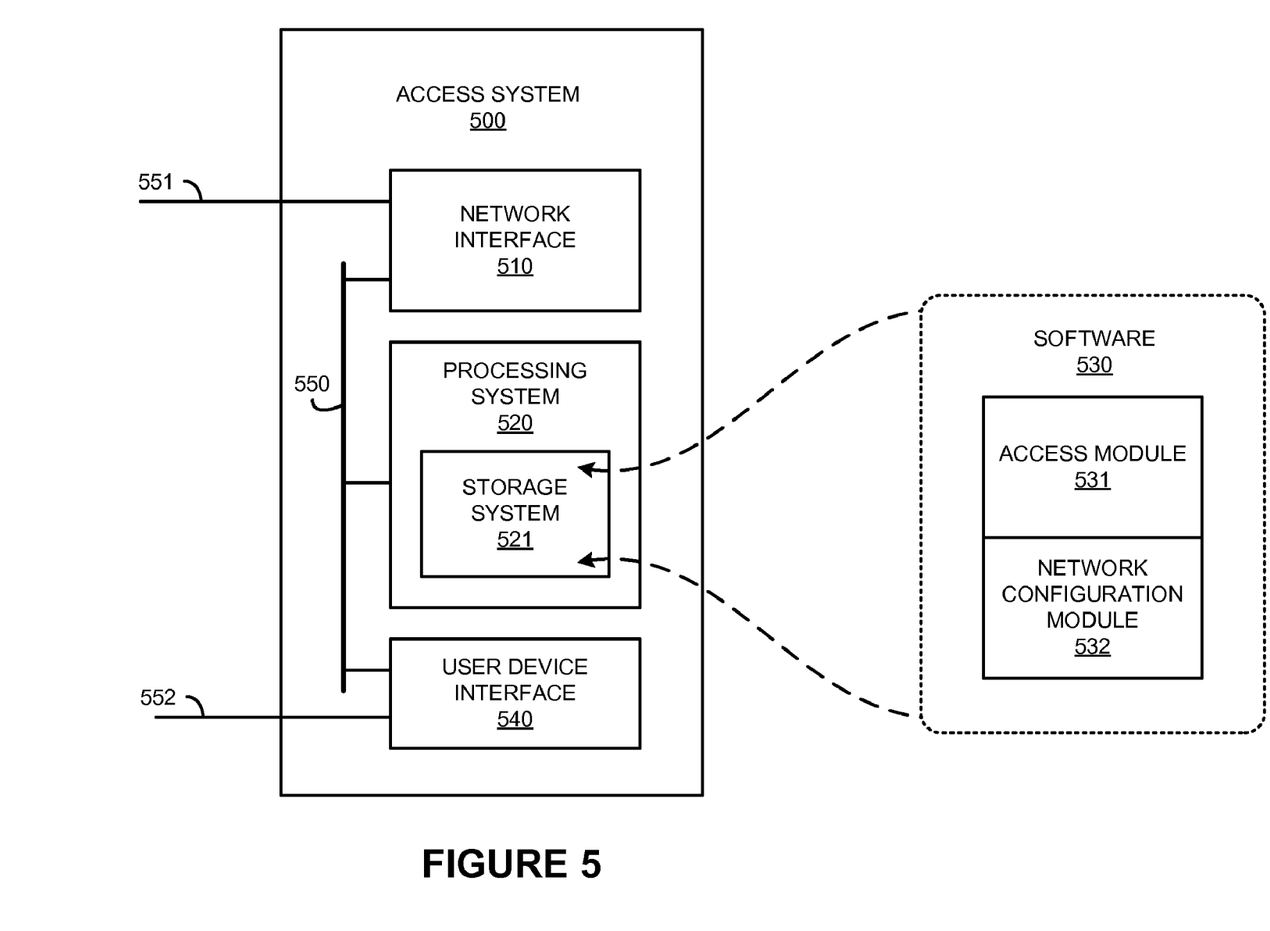
FIG. 5 is a block diagram illustrating an access system.

FIG. 5 is a block diagram illustrating access system 500, as an example of access system 120 found in FIG. 1 or wireless communication system 320 found in FIG. 3, although wireless access system 120 or wireless communication system 320 could use other configurations. Access system 500 includes network interface 510, processing system 520, and user device interface 540. Network interface 510, processing system 520, and user device interface 540 are shown to communicate over a common bus 550 for illustrative purposes. It should be understood that discrete links could be employed, such as network links. Access system 500 may be distributed or consolidated among multiple devices that together form elements 510, 520-521, 530-532, 540, and 550-552.

Network interface 510 comprises network router and gateway equipment for communicating over a packet network or between elements of a wireless communication provider, such as with Internet systems, wireless network control systems, or other communication systems. Network interface 510 exchanges user communications and overhead communications over link 551. Link 551 could use various protocols or communication formats as described herein for links 161-164 or 351-356, including combinations, variations, or improvements thereof.

Processing system 520 includes storage system 521. Processing system 520 retrieves and executes software 530 from storage system 521. In some examples, processing system 520 is located within the same equipment in which network interface 510 or wireless interface 540 are located. In further examples, processing system 520 comprises specialized circuitry, and software 530 or storage system 521 could be included in the specialized circuitry to operate processing system 520 as described herein. Storage system 521 could include a computer-readable medium such as a disk, tape, integrated circuit, server, or some other memory device, and also may be distributed among multiple memory devices.

Software 530 may include an operating system, logs, utilities, drivers, networking software, databases, and other software typically loaded onto a computer system. Software 530 could contain application programs, server software, firmware, or some other form of computer-readable processing instructions. When executed by processing system 520, software 530 directs processing system 520 to operate as described herein, such as provide access to communication services for user devices, receive registration requests for user devices, process the registration requests to associate network addresses with domain names for the user devices in response to the registration requests, provide the network addresses to the user devices, or transfer update messages for delivery to a local domain name database with the association between the network addresses and the domain names, among other operations.

In this example, software 530 includes access module 531 and network configuration module 532. It should be understood that a different configuration could be employed, and individual modules of software 530 could be included in different equipment than access system 500. Access module 531 provides access to communication services for user devices, such as user devices communicating over link 552. Access module 531 receives registration requests for user devices and communicates with network configuration module 532. Network configuration module 532 processes the registration requests to associate network addresses with domain names for the user devices in response to the registration requests. Access module 531 or network configuration module 532 provide the network addresses to the user devices. In some examples, network configuration module 532 transfers update messages for delivery to a local domain name database with the association between the network addresses and the domain names.

User device interface 540 comprises communication interfaces for communicating with user devices. User device interface 540 could include transceiver equipment or antenna elements for exchanging user communications and overhead communications with user devices in a communication system, omitted for clarity, over the associated link 552. User device interface 540 also receives command and control information and instructions from processing system 520 or network interface 510 for controlling the operations of user devices over wireless link 552, which could include coordinating handoffs of user devices between other access systems, and transferring communications for delivery to user devices. Link 552 could use various protocols or communication formats as described herein for links 160 or 350, including combinations, variations, or improvements thereof.

Bus 550 comprises a physical, logical, or virtual communication link, capable of communicating data, control signals, and communications, along with other information. In some examples, bus 550 is encapsulated within the elements of network interface 510, processing system 520, or user device interface 540, and may be a software or logical link. In other examples, bus 550 uses various communication media, such as air, space, metal, optical fiber, or some other signal propagation path, including combinations thereof. Bus 550 could be a direct link or might include various equipment, intermediate components, systems, and networks. Bus 550 could be a common link, shared link, or may be comprised of discrete, separate links.

Figure 6:
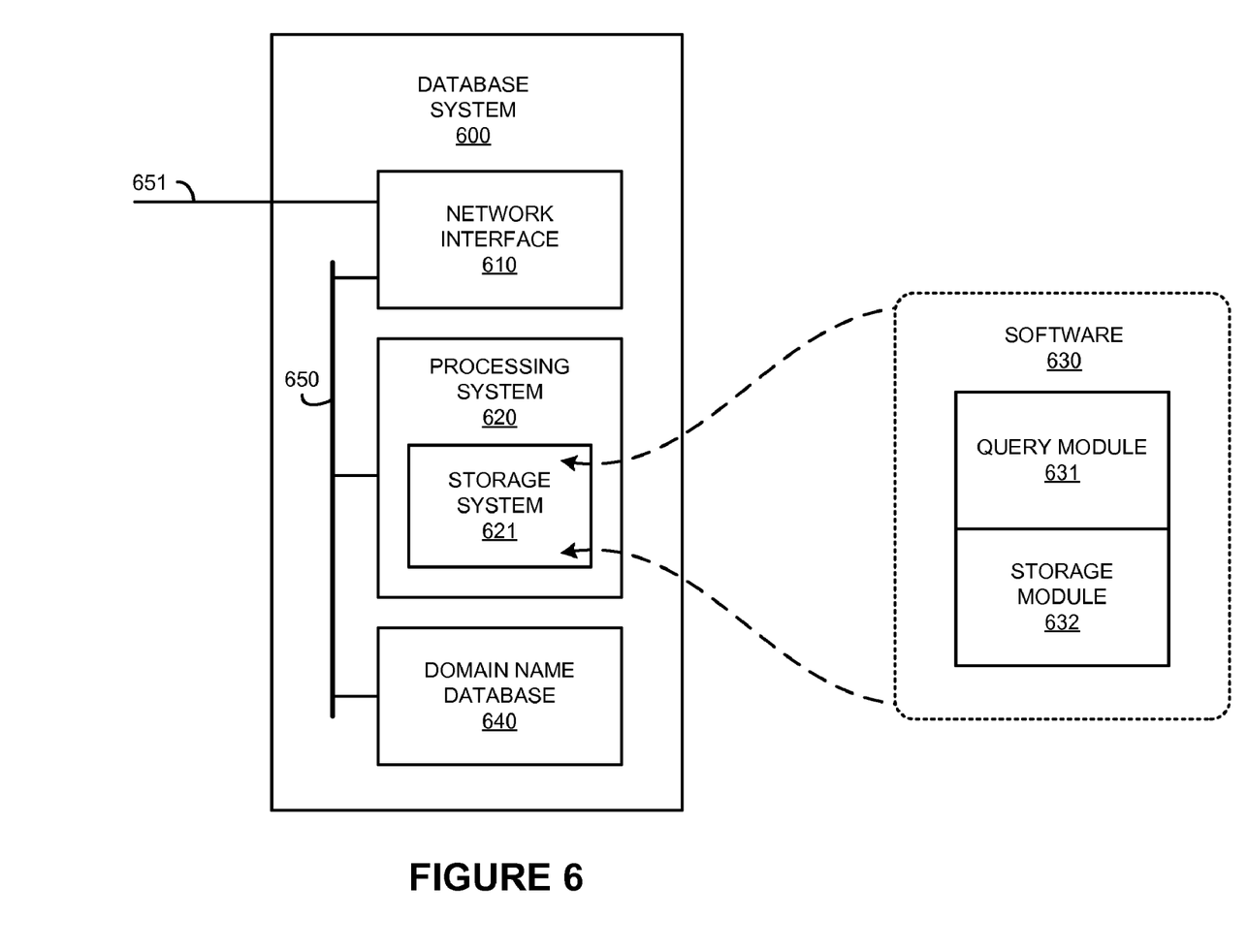
FIG. 6 is a block diagram illustrating a database system.

FIG. 6 is a block diagram illustrating database system 600, as an example of local domain name database 140 found in FIG. 1 or access gateway (AG) database 328 found in FIG. 3, although local domain name database 140 or AG database 328 could use other configurations. Database system 600 includes network interface 610, processing system 620, and domain name database 640. Network interface 610, processing system 620, and domain name database 640 communicate over a common bus 650 for illustrative purposes. It should be understood that discrete links could be employed, such as network links. Database system 600 may be distributed among multiple devices that together form elements 610, 620-621, 630-632, 640, and 650-651.

Network interface 610 comprises network router and gateway equipment for communicating over a packet network or between elements of a communication provider, such as with Internet systems, wireless access systems, or other communication systems. Network interface 610 exchanges network configuration information over link 651. Link 651 could use various protocols or communication formats as described herein for links 161-164 or 351-356, including combinations, variations, or improvements thereof.

Processing system 620 includes storage system 621. Processing system 620 retrieves and executes software 630 from storage system 621. In some examples, processing system 620 is located within the same equipment in which network interface 610 or domain name database 640 are located. In further examples, processing system 620 comprises specialized circuitry, and software 630 or storage system 621 could be included in the specialized circuitry to operate processing system 620 as described herein. Storage system 621 could include a computer-readable medium such as a disk, tape, integrated circuit, server, or some other memory device, and also may be distributed among multiple memory devices.

Software 630 may include an operating system, logs, utilities, drivers, networking software, databases, and other software typically loaded onto a computer system. Software 630 could contain application programs, databases, server software, firmware, or some other form of computer-readable processing instructions. When executed by processing system 620, software 630 directs processing system 620 to operate as described herein, such as receive queries for domain name associations for user devices, or transfer associations between network addresses and domain names for delivery to domain name database systems, among other operations.

In this example, software 630 includes query module 631 and storage module 632. It should be understood that a different configuration could be employed, and individual modules of software 630 could be included in different equipment than wireless access system 600. Query module 631 receives queries for domain name associations for user devices, responsively queries domain name database 640 for the domain name associations, and transfers associations between network addresses and domain names for delivery to domain name database systems, among other operations. Storage module 632 receives associations between network addresses and domain name information for transfer and storage in domain name database 640.

Domain name database 640 comprises a computer-readable medium for storing user device network information, such as domain name association information. Domain name database 640 could be included in the equipment or systems of processing system 620 or network interface 610, or be included in separate equipment or systems. In examples of separate equipment or systems, domain name database 640 could include communication interfaces, computer systems, microprocessors, circuitry, or other processing devices or software systems, and may be distributed among multiple processing or storage devices. Examples of domain name database 640 may also each include software such as an operating system, logs, utilities, drivers, networking software, and other software stored on a computer-readable medium. Domain name database 640 could also each include application servers, application service provider systems, database systems, web servers, or other systems. Domain name database 640 includes equipment to receive queries for domain name associations for user devices and responsively transfer associations between network addresses and domain names for delivery to domain name database systems, among other operations Bus 650 comprises a physical, logical, or virtual communication link, capable of communicating data, control signals, and communications, along with other information. In some examples, bus 650 is encapsulated within the elements of network interface 610, processing system 620, or domain name database 640, and may be a software or logical link. In other examples, bus 650 uses various communication media, such as air, space, metal, optical fiber, or some other signal propagation path, including combinations thereof. Bus 650 could be a direct link or might include various equipment, intermediate components, systems, and networks. Bus 650 could be a common link, shared link, or may be comprised of discrete, separate links.

Referring back to FIG. 1, user device 110 comprises transceiver circuitry and communication elements. The transceiver circuitry typically includes amplifiers, filters, modulators, and signal processing circuitry. User device 110 may also include user interface systems, memory devices, computer-readable storage mediums, software, processing circuitry, or some other communication components. User device 110 may be a wireless communication device, subscriber equipment, customer equipment, access terminal, telephone, mobile wireless telephone, computer, e-book, mobile Internet appliance, wireless network interface card, media player, game console, or some other wireless communication apparatus, including combinations thereof. Although one user devices is shown in FIG. 1, it should be understood that a different number of user devices could be shown.

Access system 120 comprises communication and control systems for providing access to communication services for user devices. Access system 120 may also include circuitry such as amplifiers, filters, modulators, transceivers, and signal processing circuitry for communication with user device 110. In some examples, access system 120 includes equipment to provide wireless access to communication services within different coverage areas to user devices, route communications between content providers and user devices, receive registration and content requests, or to provide network information, domain name information, or other configuration information to user devices and local domain name databases, among other operations. Access system 120 may also comprise base stations, base transceiver stations (BTS), base station controllers (BSC), mobile switching centers (MSC), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, wireless data access points, routers, databases, or other communication and control equipment.

Packet network 130 comprises data packet routing and distribution systems, such as Internet protocol packet routing equipment and systems. Packet network 130 could also include various Ethernet equipment and systems, optical networks, asynchronous transfer mode (ATM) networks, metropolitan-area networks (MAN), or other network topologies, equipment, or systems, including combinations thereof.

Local domain name database 140 and master domain name database 150 each comprise a computer-readable medium for storing user device network information, such as domain name association information. Local domain name database 140 could be included in the equipment or systems of access system 120, or be included in separate equipment or systems. Master domain name database 150 could be included in the equipment or systems of packet network 130, or be included in separate equipment or systems. In examples of separate equipment or systems, local domain name database 140 and master domain name database 150 each could include communication interfaces, computer systems, microprocessors, circuitry, or other processing devices or software systems, and may be distributed among multiple processing devices. Examples of local domain name database 140 and master domain name database 150 may also each include software such as an operating system, logs, utilities, drivers, networking software, and other software stored on a computer-readable medium. Local domain name database 140 and master domain name database 150 could also each include application servers, application service provider systems, database systems, web servers, or other systems.

Communication links 160-164 use metal, glass, optical, air, space, or some other material as the transport media. Communication links 160-164 could use various communication protocols, such as Time Division Multiplex (TDM), asynchronous transfer mode (ATM), Internet Protocol (IP), Ethernet, synchronous optical networking (SONET), circuit-switched, communication signaling, or some other communication format, including combinations, improvements, or variations thereof. Communication links 160-164 could each be direct links or may include intermediate networks, systems, or devices.

In some examples, communication link 160 is a wireless link and may use various protocols, such as Code Division Multiple Access (CDMA), Evolution-Data Optimized (EV-DO), single-carrier radio transmission technology link (1xRTT), Worldwide Interoperability for Microwave Access (WIMAX), Global System for Mobile Communication (GSM), Universal Mobile Telecommunications System (UMTS), Long Term Evolution (LTE), Wireless Fidelity (Wi-Fi), High Speed Packet Access (HSPA), Radio Link Protocol (RLP), or some other wireless communication format, including combinations, improvements, or variations thereof.

Communication links 160-164 may each include many different signals sharing the same associated link—as represented by the associated lines in FIG. 1—comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a communication system, the method comprising:

receiving a registration request for a user device;

processing the registration request to associate a network address with domain name information for the user device;

transferring an update message for delivery to a local domain name database comprising a mobile access gateway (MAG) of a wireless communication system with the association between the network address and the domain name information for the user device, and withholding an update of the association in a master domain name database comprising an Internet domain name system (DNS) server;

receiving a first query for the association between the network address and the domain name information for the user device into the master domain name database, and in response, transferring a second query for delivery to the local domain name database; and receiving the second query in the local domain name database, and in response, transferring the association between the network address and the domain name information for the user device for delivery to the master domain name database.

2. The method of claim 1, further comprising:

modifying a query response behavior of the master domain name database, wherein the modified query response behavior indicates that the master domain name database transfers the second query to the local domain name database to determine the association between the network address and the domain name information for the user device instead of processing contents of the master domain name database to determine the association.

3. The method of claim 1, further comprising:

configuring the master domain name database to query the local domain name database to determine domain name associations for a range of network addresses, wherein the range of network addresses comprises the network address of the user device.

4. The method of claim 1, further comprising:

in the master domain name database, transferring a first response to the first query, wherein the first response comprises the association between the network address and the domain name information for the user device.

5. The method of claim 1, further comprising:

receiving a registration stop message for the user device;

processing the registration stop message to transfer a disassociation message for delivery to the local domain name database; and in response to the disassociation message, disassociating the network address from the domain name for the user device in the local domain name database, and withholding the disassociation message from delivery to the master domain name database.

6. The method of claim 1, further comprising:

transferring an indicator of the network address for delivery to the user device in response to the registration request.

7. The method of claim 1, wherein the registration request for the user device comprises an accounting start message for the user device, and wherein receiving the registration request comprises receiving the registration request into an authentication, authorization and accounting (AAA) server of a wireless communication system.

8. The method of claim 1, wherein the first query comprises a reverse domain name system (DNS) lookup for the user device.

9. The method of claim 1, wherein the network address comprises an Internet protocol (IP) address of the user device, and wherein the domain name information for the user device comprises a uniform resource locator (URL) of the user device.

10. A communication system comprising:

an access system configured to receive a registration request for a user device and process the registration request to associate a network address with domain name information for the user device;

the access system configured to transfer an update message for delivery to a local domain name database comprising a mobile access gateway (MAG) of a wireless communication system with the association between the network address and the domain name information for the user device, and withhold an update of the association in a master domain name database comprising an Internet domain name system (DNS) server;

the master domain name database configured to receive a first query for the association between the network address and the domain name information for the user device, and in response, transfer a second query for delivery to the local domain name database; and the local domain name database configured to receive the second query, and in response, transfer the association between the network address and the domain name information for the user device for delivery to the master domain name database.

11. The communication system of claim 10, comprising:

the master domain name database configured to modify a query response behavior of the master domain name database, wherein the modified query response behavior indicates that the master domain name database transfers the second query to the local domain name database to determine the association between the network address and the domain name information for the user device instead of processing contents of the master domain name database to determine the association.

12. The communication system of claim 10, comprising:

the access system configured to instruct the master domain name database to query the local domain name database to determine domain name associations for a range of network addresses, wherein the range of network addresses comprises the network address of the user device.

13. The communication system of claim 10, comprising:

the master domain name database configured to transfer a first response to the first query, wherein the first response comprises the association between the network address and the domain name information for the user device.

14. The communication system of claim 10, comprising:

the access system configured to receive a registration stop message for the user device and process the registration stop message to transfer a disassociation message for delivery to the local domain name database; and in response to the disassociation message, the local domain name database configured to disassociate the network address from the domain name for the user device in the local domain name database and withhold the disassociation message from delivery to the master domain name database.

15. The communication system of claim 10, comprising:

the access system configured to transfer an indicator of the network address for delivery to the user device in response to the registration request.

16. The communication system of claim 10, wherein the registration request for the user device comprises an accounting start message for the user device, and wherein the access system comprises a authentication, authorization and accounting (AAA) server of a wireless communication system configured to receive the registration request.

17. The communication system of claim 10, wherein the first query comprises a reverse domain name system (DNS) lookup for the user device.

18. The communication system of claim 10, wherein the network address comprises an Internet protocol (IP) address of the user device, and wherein the domain name information for the user device comprises a uniform resource locator (URL) of the user device.

* * * * *